United States Patent
Tsai

(10) Patent No.: US 11,609,997 B2
(45) Date of Patent: Mar. 21, 2023

(54) AUTONOMOUS DRIVING SYSTEM WITH DUAL SECURE BOOT

(71) Applicant: Quanta Computer Inc., Taoyuan (TW)

(72) Inventor: Yueh-Chang Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 304 days.

(21) Appl. No.: 17/038,132

(22) Filed: Sep. 30, 2020

(65) Prior Publication Data

US 2022/0035926 A1 Feb. 3, 2022

(30) Foreign Application Priority Data

Jul. 31, 2020 (TW) .................................. 109125904

(51) Int. Cl.
| | |
|---|---|
| G06F 21/57 | (2013.01) |
| G06F 21/44 | (2013.01) |
| G06F 21/62 | (2013.01) |
| G06F 21/74 | (2013.01) |
| G06F 9/4401 | (2018.01) |
| G06F 9/445 | (2018.01) |

(52) U.S. Cl.
CPC ............ G06F 21/575 (2013.01); G06F 21/44 (2013.01); G06F 21/62 (2013.01); G06F 21/74 (2013.01)

(58) Field of Classification Search
CPC ........ G06F 21/575; G06F 21/44; G06F 21/62; G06F 21/74
See application file for complete search history.

(56) References Cited

U.S. PATENT DOCUMENTS

| | | | |
|---|---|---|---|
| 2016/0055113 A1* | 2/2016 | Hodge | G06F 3/0683 710/308 |
| 2018/0095740 A1* | 4/2018 | Kotary | G06F 9/445 |
| 2018/0165455 A1* | 6/2018 | Liguori | G06F 21/575 |
| 2020/0202004 A1* | 6/2020 | Montero | G06F 21/602 |
| 2020/0401533 A1* | 12/2020 | Golov | G06F 12/1466 |

* cited by examiner

*Primary Examiner* — Jaweed A Abbaszadeh
*Assistant Examiner* — Gayathri Sampath
(74) *Attorney, Agent, or Firm* — McClure, Qualey & Rodack, LLP

(57) ABSTRACT

An autonomous driving system having dual secure boot is provided. The autonomous driving system includes: a control system, a host, and a baseboard management controller (BMC). The control system includes a microcontroller, a first flash memory, and a second flash memory. The first flash memory stores first embedded-controller firmware and a first application image file. The second flash memory stores second embedded-controller firmware and a second application image file. When the autonomous driving system is turned on, the microcontroller executes a dual secure boot procedure to execute the first embedded-controller firmware or the second embedded-controller firmware. In response to the microcontroller successfully executing the first embedded-controller firmware or the second embedded-controller firmware, the microcontroller authenticates the first application image file or the second application image file. In response to the BMC executing the authenticated first application image file or second application image file, the host executes a boot procedure.

9 Claims, 4 Drawing Sheets

AUTONOMOUS DRIVING SYSTEM WITH DUAL SECURE BOOT

CROSS REFERENCE TO RELATED APPLICATIONS

This Application claims priority of Taiwan Patent Application No. 109125904 filed on Jul. 31, 2020, the entirety of which is incorporated by reference herein.

BACKGROUND OF THE INVENTION

Field of the Invention

The present invention relates to a computer system, and, in particular, to an autonomous driving system with dual secure boot.

Description of the Related Art

With the advances being made in technology, the stability and safety requirements on autonomous driving technology are getting higher and higher. Although a conventional autonomous driving system can use hardware secure boot technology to prevent an autonomous driving system from being attacked or infected by malicious software, the conventional autonomous driving system is only equipped with a single secure boot design, which cannot prevent the autonomous driving system from crashing due to damage of the storage component.

Accordingly, there is demand for an autonomous driving system with dual secure booting to solve the aforementioned problem.

BRIEF SUMMARY OF THE INVENTION

A detailed description is given in the following embodiments with reference to the accompanying drawings.

In an exemplary embodiment, an autonomous driving system having dual secure boot is provided. The autonomous driving system includes: a control system, a host, and a baseboard management controller (BMC). The control system includes a microcontroller, a first flash memory, and a second flash memory. The first flash memory is configured to store first embedded-controller firmware and a first application image file. The second flash memory is configured to store second embedded-controller firmware and a second application image file. The BMC is coupled between the control system and the host. When the autonomous driving system is turned on, the microcontroller executes a dual secure boot procedure to execute the first embedded-controller firmware or the second embedded-controller firmware. In response to the microcontroller successfully executing the first embedded-controller firmware or the second embedded-controller firmware, the microcontroller authenticates the first application image file or the second application image file. In response to the BMC executes the authenticated first application image file or the authentication second application image file, the host executes a boot procedure.

In some embodiments, the microcontroller includes a first read-only memory (ROM), and a one-time programmable (OTP) memory, and the first ROM stores a bootloader, and the OTP memory stores an ECDH (Elliptic Curve Diffie-Hellman Key Exchange) private key, a first ECDSA (Elliptic Curve Digital Signature Algorithm) public key, a second ECDSA public key, and an RSA public-key hash value. The first embedded-controller firmware and the second embedded-controller firmware store an ECDH public key and a first ECDSA private key, and the first application image file and the second application image file store an RSA private key. The first flash memory stores a first application configuration and the second flash memory stores a second application configuration, and the first application configuration and the second application configuration store a second ECDSA private key.

In some embodiments, during the dual secure boot procedure, the microcontroller decrypts and authenticates the first embedded-controller firmware using the ECDH private key and the first ECDSA public key. When the decryption or authentication of the first embedded-controller firmware fails, the microcontroller decrypts and authenticates the second embedded-controller firmware using the ECDH private key and the first ECDSA public key.

In some embodiments, during the dual secure boot procedure, when the microcontroller successfully executes the first embedded-controller firmware, the microcontroller authenticates the first application configuration using the second ECDSA public key. When the authentication of the first application configuration fails, the microcontroller authenticates the second application configuration using the second ECDSA public key. When the microcontroller successfully executes the second embedded-controller firmware, the microcontroller authenticates the second application configuration using the second ECDSA public key.

In some embodiments, during the dual secure boot procedure, the microcontroller decrypts the first application image file or the second application image file using the RSA public key stored in the first flash memory or the second flash memory and the RSA public-key has value.

In some embodiments, when the microcontroller is executing the dual secure boot procedure, the microcontroller transmits a reset signal to the BMC and the host to suspend operations of the BMC and the host. After the microcontroller completes the dual secure boot procedure and successfully executes the first embedded-controller firmware or the second embedded-controller firmware, the microcontroller de-asserts the reset signal to start the operation of the BMC.

In some embodiments, the host comprises a processor, a platform control hub (PCH), a third flash memory, and a fourth flash memory, and the PCH is coupled to the processor, the third flash memory, the fourth flash memory, and the BMC. The third flash memory and the fourth flash memory respectively store first basic input/output system (BIOS) firmware and second BIOS firmware. During the boot procedure of the host, the processor first reads the first BIOS firmware, and when the processor determines that the first BIOS firmware is not damaged and the first BIOS firmware passes authentication, the processor executes the first BIOS firmware to continue the boot procedure. When the processor determines that the first BIOS firmware is damaged or the authentication of the first BIOS firmware fails, the processor reads the second BIOS firmware, and when the processor determines that the second BIOS firmware is not damaged and authentication of the second BIOS firmware is successful, the processor executes the second BIOS firmware to continue the boot procedure

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It should be understood that the words "including", "including" and other words used in this specification are used to indicate the existence of specific technical features, values, method steps, operations, elements and/or components, but not It is not excluded that more technical features, values, method steps, job processing, elements, components, or any combination of the above can be added.

Words such as "first", "second", and "third" used in the claims are used to modify the elements in the claims, and are not used to indicate that there is an order of priority, antecedent relationship, or One element precedes another element, or the chronological order of method steps, only used to distinguish elements with the same name.

Figure 1:
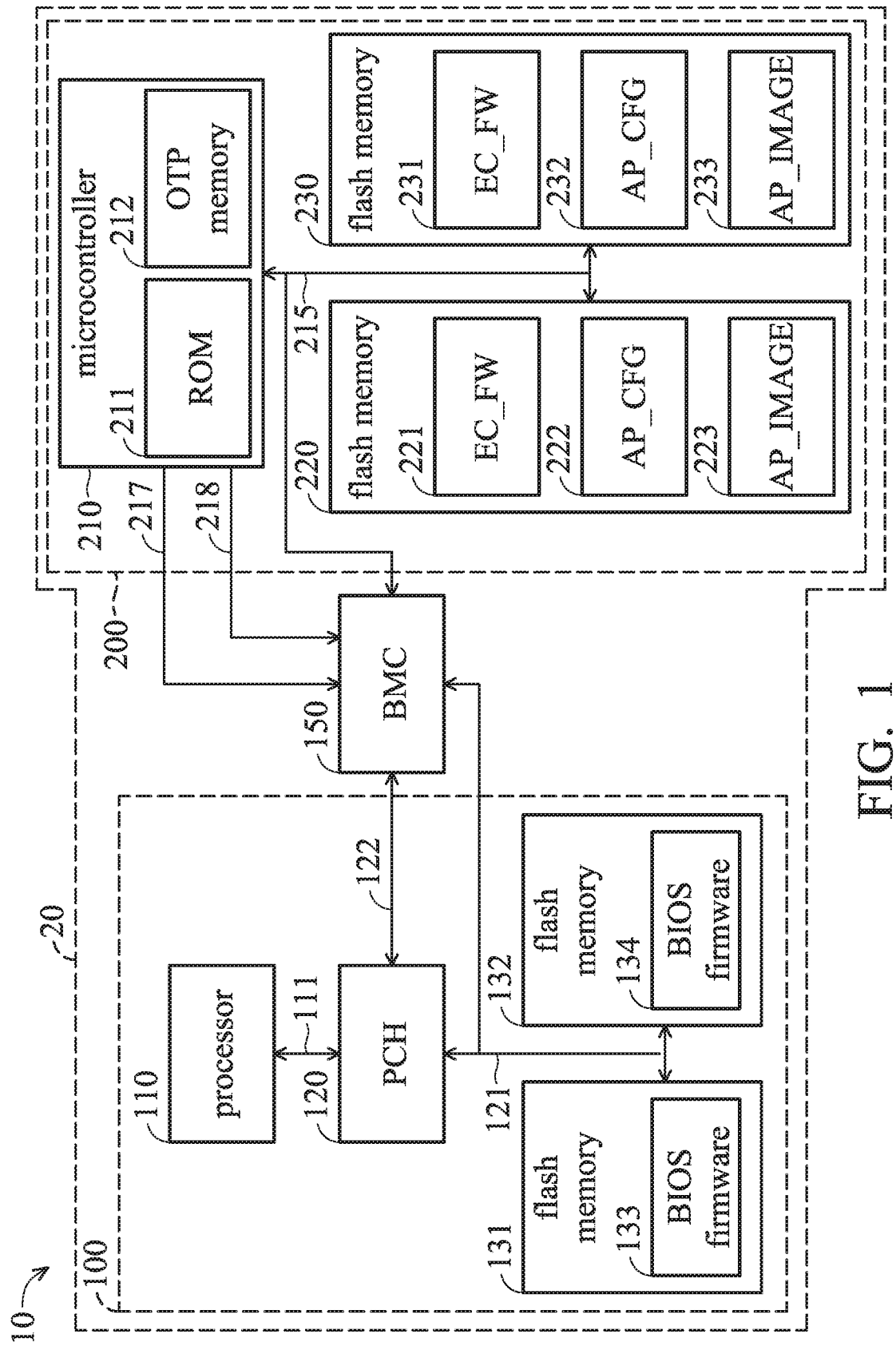
FIG. 1 is a diagram of an autonomous driving system in accordance with an embodiment of the invention.

FIG. 1 is a diagram of an autonomous driving system in accordance with an embodiment of the invention.

The autonomous driving system 10 includes a host, a baseboard management controller (BMC) 150, and a control system 200. The host 100, BMC 150, and control system 200, for example, are disposed on a mainboard 20.

In an embodiment, the host 100 includes a processor 110, a platform controller hub (PCH) 120, and flash memories 131 and 132. The processor 110 may be a central processing unit or a general-purpose processor. The PCH 120 is connected to the processor 110 and flash memories 131 and 132, and can be used as a bridge for data transmission between the processor 110 and the flash memories 131 and 132. The PCH 120 is connected to the flash memories 131 and 132 through a standard peripheral interface (SPI) bus. The processor 110 and the PCH 120 may communicate with each other through a direct media interface (DMI) bus 111. In addition, the PCH 120 can be connected to the BMC 150 through bus 121 (e.g., an embedded standard peripheral interface (eSPI) bus), so that the processor 110 can communicate with the BMC 150 to perform data transmission.

The flash memories 131 and 132 are configured to respectively store a basic input/output system (BIOS) firmware 133 and a BIOS firmware 134, wherein the BIOS firmware 133 is identical to the BIOS firmware 144, and the BIOS firmware 133 is the primary BIOS firmware of the host 100, and the BIOS firmware 134 is the backup BIOS firmware of the host 100. In some embodiments, the flash memories 131 and 132, for example, may be different memory spaces in the same flash memory. In some other embodiments, in order to increase the security of the BIOS firmware of host 100, the flash memory 131 and 132 may be implemented by different flash memory chips, but the invention is not limited thereto.

The BMC 150 is configured to coordinate data and synchronization between the host 100 and the control system 200. For example, with regard to the autonomous driving system 100, the control system 200 is connected to a sensor hub (not shown), and the sensor hub may include sensors of different types to detect various environmental information inside or surrounding the vehicle. Since the sensors of different types may detect corresponding environmental information with different frequencies, and the size of sensor data of different types may vary, if the sensor data collected by the sensors of different types in the sensor hub is reported to the PCH 120, it may cause serious burden to the performance of the host 100. Accordingly, there is need for the BMC 150 to coordinate the data and synchronization between the host 100 and the control system 200.

The control system 200 may include a microcontroller 210 and flash memories 220 and 230. The microcontroller 210 is configured to control the dual secure boot procedure of the control system 200. The microcontroller 210 and the BMC 150 may access data stored in the flash memories 220 and 230 through an SPI bus, and the microcontroller 210 may communicate with the BMC 150 through the I2C bus 217. It should be noted that when the autonomous driving system 10 is turned on or power recovery and enters the boot procedure, the priority of the control system 200 is higher than those of the BMC 150 and host 100. That is, the control system needs to successfully complete the secure boot procedure before executing the booting procedure of the BMC 150 and the booting procedure of the host 100.

The microcontroller 210, for example, may be implemented by an application-specific integrated circuit (ASIC). The microcontroller 210 may include a read-only memory (ROM) 211 and a one-time programmable (OTP) memory 212. The ROM 211 is configured to store a bootloader EC_BL, wherein the bootloader EC_BL can be regarded as a hardware "root of trust" of the control system 200. The OTP memory 212 is configured to store a plurality of private keys or public keys, function settings, JTAG (Joint Test Action Group) settings, and a base address of a joint test action group TAG0.

The flash memories 220 and 230, for example, can be used as read-only memories that can be regarded as FLASH ROMs. In some embodiments, the flash memories 220 and 230 may be different memory spaces in the same flash memory chip. In some other embodiments, in order to increase the security of the control system 200, the flash memories 220 and 230 may be implemented by different flash memory chips, but the invention is not limited thereto.

The flash memory 220 may include embedded-controller firmware (EC_FW) 221, application configuration (AP_CFG) 222, and an application image file (AP_IMAGE FILE) 223, wherein the embedded-controller firmware 221, application configuration 222, and application image file 223 record the corresponding encryption and decryption public key or private key, which corresponds to the encryption and decryption private key or public key stored in the OTP memory 212.

For example, the encryption and decryption private key or public key may include an ECDH (Elliptic Curve Diffie-Hellman Key Exchange) private key, a first ECDSA (Elliptic Curve Digital Signature Algorithm) public key, a second ECDSA public key, and an RSA 2018 public-key hash value. The embedded-controller firmware 221 may store an ECDH public key and a first ECDSA private key. The application configuration 222 may store a second ECDSA private key, and the application image file 223 may store an RSA 2048 private key. In addition, the flash memory 220 may store an RSA 2048 public key. Accordingly, the microcontroller 210 may perform hash calculation, decryption calculation, and authentication calculation using the public keys or private keys stored in the OTP memory 212, embedded-controller firmware 221, application configuration 222, and application image file 223.

The flash memory 230 may include embedded-controller firmware (EC_FW) 231, application configuration (AP_CFG) 232, and an application image file (AP_IMAGE FILE) 233, wherein content stored in the embedded-controller firmware (EC_FW) 231, application configuration (AP_CFG) 232, and an application image file (AP_IMAGE FILE) 233 is similar to that stored in the embedded-controller firmware (EC_FW) 221, application configuration (AP_CFG) 222, and an application image file (AP_IMAGE FILE) 223, and thus the details will be omitted here.

Specifically, the flash memory 220 is the primary storage space of the embedded-controller firmware, application configuration, and application image file of the control system 200 and BMC 150, and the flash memory 230 is used as a backup storage space. Generally, when the user wants to update the firmware of the autonomous driving system 10, only the embedded-controller firmware 221, application configuration 222, or the application image file stored in the flash memory 220 are often allowed to be updated. The embedded-controller firmware 231, application configuration 232, and application image file 233 can be regarded as the original factory settings with a high degree of security, and are usually not modified or updated, so the probability of the embedded-controller firmware 231, application configuration 232, and application image file 233 being damaged is very low.

During the boot procedure of the control system 200, when the bootloader EC_BL executed by the secure microcontroller 210 determines that the embedded-controller firmware in the flash memory 220 is damaged, the bootloader EC_BL will read the backup embedded-controller firmware 231 from the flash memory 230. In addition, during the boot procedure of the BMC 150, when the BMC 150 determines that the application configuration 222 or the application image file 223 is damaged, the BMC 150 will read the backup application configuration 232 or application image file 233 from the flash memory 230.

For example, when the autonomous driving system 10 is turned on or power to the autonomous driving system is recovered from power failure, the microcontroller 210 will assert the reset signal (AP_RESET) 218 to suspend the operation of the BMC 150, and the microcontroller 210 may first read the embedded-controller firmware 221 in the flash memory 220. The microcontroller 210 may decrypt the embedded-controller firmware 221 using the ECDH private key stored in the OTP memory 212, and authenticate the decrypted embedded-controller firmware 221 using the first ECDSA public key, or perform the authentication before the decryption. If the decryption or authentication procedure fails, the microcontroller 210 will then read the embedded-controller firmware 231 from the flash memory 230, and perform the decryption and authentication procedure.

Specifically, when the authenticated embedded-controller firmware 221 successfully operates on the microcontroller 210, the authenticated embedded-controller firmware 221 will then authenticate the application image file 223 (and application configuration 222) in the flash memory 220, such as authenticating the application image file 223 using the RSA public key. If the application image file 223 is successfully authenticated, the microcontroller will de-assert the reset signal 218 to allow the BMC 150 to read the application image file 223 from the flash memory 220 and execute the application image file 223. If the authentication of the application image file 223 fails, the microcontroller will repeatedly assert the reset signal 218 to suspend the operation of the BMC 150, and read the application image file 233 from the flash memory 230, and authenticate the application image file 233 using the RSA public key. If the application image file 233 is successfully authenticated, the microcontroller 210 will de-assert the reset signal 218 to allow the BMC 150 to read the application image file 233 from the flash memory 230 and execute the application image file 233.

Similarly, when the authentication of the embedded-controller firmware 221 fails or the embedded-controller firmware 221 is damaged, the embedded-controller firmware 231 will be authenticated by the microcontroller 210. If the embedded-controller firmware 231 is successfully authenticated and operating on the microcontroller 210, the authenticated embedded-controller firmware 231 will then authenticate the application image file 233 (and the application configuration 232), such as authenticating the application image file 233 using the RSA public key.

Figure 2:
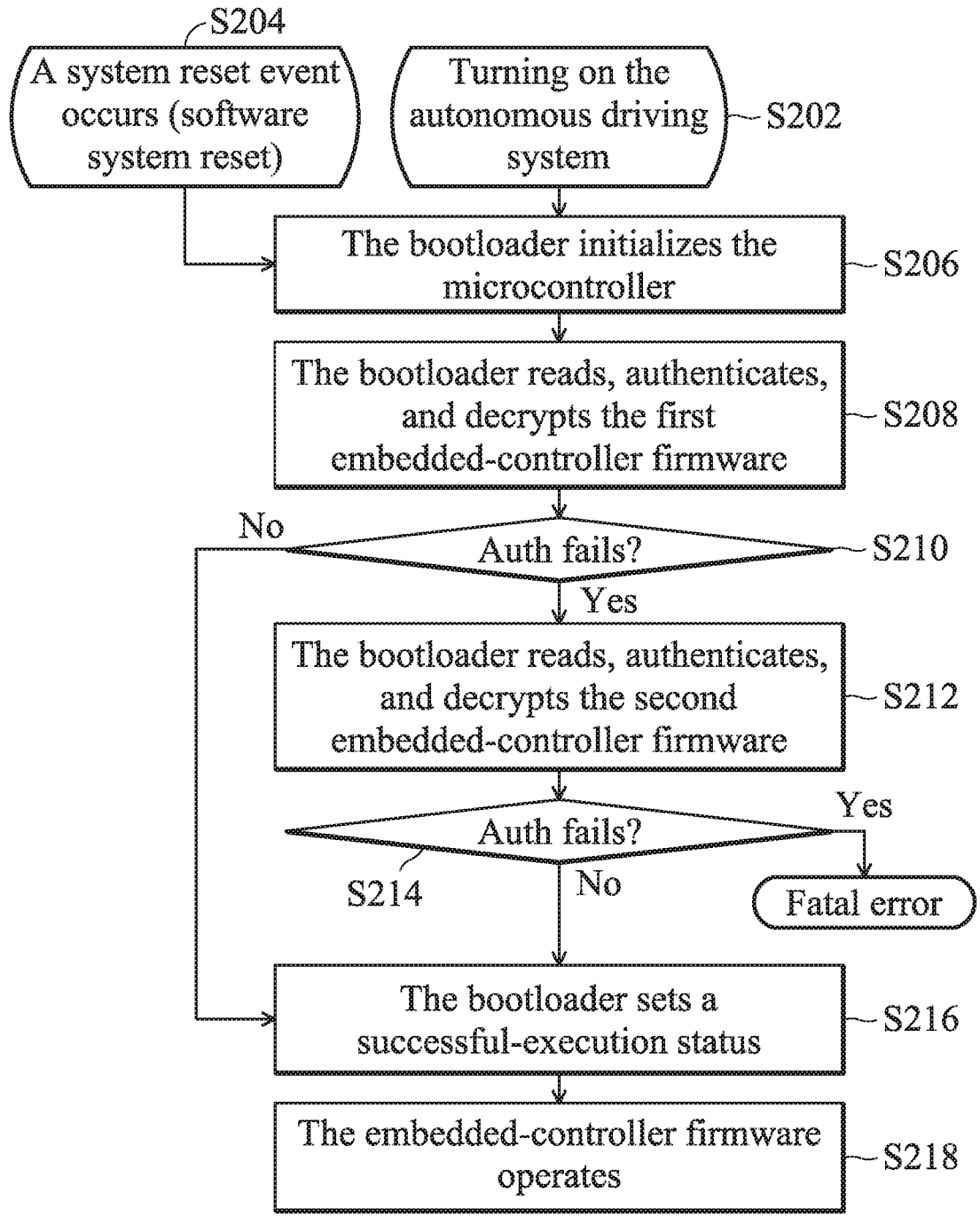
FIG. 2 is a flow chart of authenticating the embedded-controller firmware by the bootloader in accordance with an embodiment of the invention.

FIG. 2 is a flow chart of authenticating the embedded-controller firmware by the bootloader in accordance with an embodiment of the invention.

In step S202, the autonomous driving system is turned on.

In step S204, a system-reset event occurs. The aforementioned system-reset event may indicate a software system-reset operation. No matter whether step S202 or S204 is performed, the flow proceeds to step S206.

In step S206, the bootloader initializes the microcontroller 210.

In step S208, the bootloader reads, authenticates, and decrypts the first embedded-controller firmware. For example, the first embedded-controller firmware is the primary boot firmware of the control system 200, such as the embedded-controller firmware 221 stored in the flash memory 220.

In step S210, it is determined whether the authentication of the first embedded-controller firmware fails. If it is determined that the authentication of the first embedded-controller firmware fails, step S212 is performed. If it is determined that the authentication of the first embedded-controller firmware succeeds, step S216 is performed.

In step S212, the bootloader reads, authenticates, and decrypts the second embedded-controller firmware. For example, the second embedded-controller firmware is the backup boot firmware of the control system 200, such as the embedded-controller firmware 231 stored in the flash memory 230.

In step S214, it is determined whether the authentication of the second embedded-controller firmware fails. If it is determined that the authentication of the second embedded-controller firmware fails, a fatal error occurs. If it is determined that the authentication of the second embedded-controller firmware succeeds, step S216 is performed. When a fatal error occurs, the microcontroller 210 or the BMC 150 will handle the fatal error separately. For example, the microcontroller 210 may set a corresponding control signal pin, and assert the reset signal 218 to suspend the operations of the BMC 150 and processor 110.

In step S216, the bootloader sets a successful-execution status. No matter whether the first embedded-controller firmware is successfully authenticated in step S210 or the second embedded-controller firmware is successfully authenticated in step S214, the bootloader can set the successful-execution status, such as modifying the value of the corresponding register to indicate that the microcontroller 210 has successfully execute the embedded-controller firmware, and in step S218, the embedded-controller firmware operates on the microcontroller 210.

Figure 3:
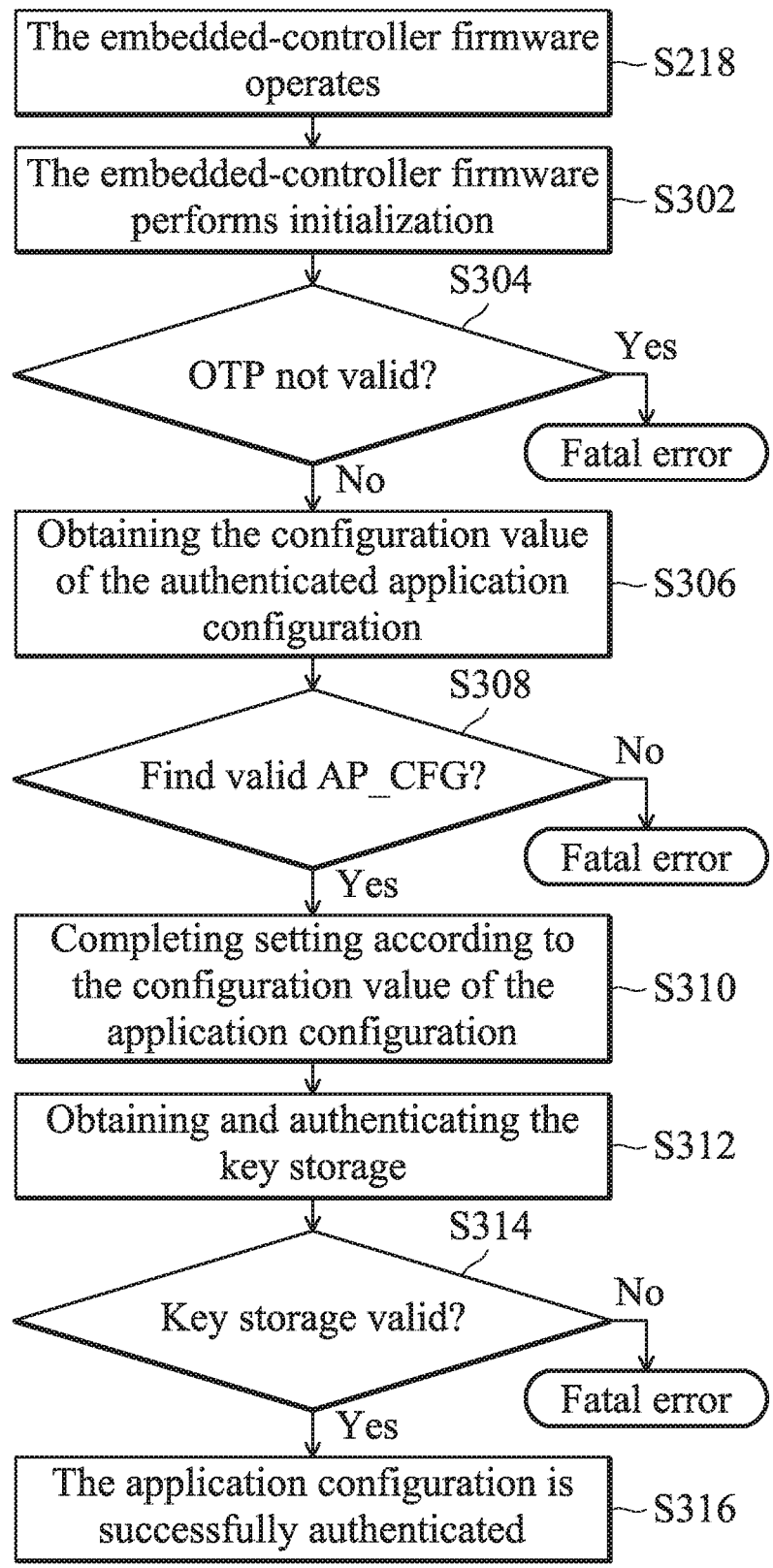
FIG. 3 is a flow chart of authenticating the application configuration by the embedded-controller firmware in accordance with an embodiment of the invention.

FIG. 3 is a flow chart of authenticating the application configuration by the embedded-controller firmware in accordance with an embodiment of the invention.

The flow in FIG. 3 starts from step S218 in FIG. 2. That is, after the embedded-controller firmware operates on the microcontroller 210, the embedded-controller firmware will check and authenticate the application configuration 222 or 232.

In step S302, the embedded-controller firmware performs initialization.

In step S304, it is determined whether the OTP memory 212 is not valid. If it is determined that the OTP memory 212 is not valid, a fatal error occurs. If it is determined that the OTP memory is valid, step S306 is performed.

In step S306, the configuration value of the authenticated application configuration is obtained. For example, the embedded-controller firmware may obtain the configuration value of the authenticated application configuration from the flash memory 220 or 230.

In step S308, it is determined whether a valid application configuration is found. If it is determined that a valid application configuration is found, step S310 is performed. If it is determined that any valid application configuration is not found, a fatal error occurs.

In step S310, the configuration operation is completed according to the configuration value of the application configuration. For example, the configuration value may be various parameters required by the BMC 150 or processor 110 to operate the autonomous driving system 10, such as sensor settings, road condition settings, driving strategy settings, route planning settings, and so on.

In step S312, a key storage is obtained and authenticated. For example, the key storage is located in the OTP memory 212, and the encryption and decryption private keys or public keys stored in the key storage include an ECDH private key, a first ECDSA public key, a second ECDSA public key, and an RSA 2048 public-key hash value.

In step S314, it is determined whether the key storage is valid. If it is determined that the key storage is valid, step S316 is performed. If it is determined that the key storage is not valid, a fatal error occurs. The embedded-controller firmware may determine whether the key storage in the OTP memory 212 is valid or not. When the key storage is valid, the embedded-controller firmware may perform authentication calculations using the second ECDSA private key in the application configuration and the second ECDSA public key in the key storage.

In step S316, the application configuration is successfully authenticated.

Figure 4:
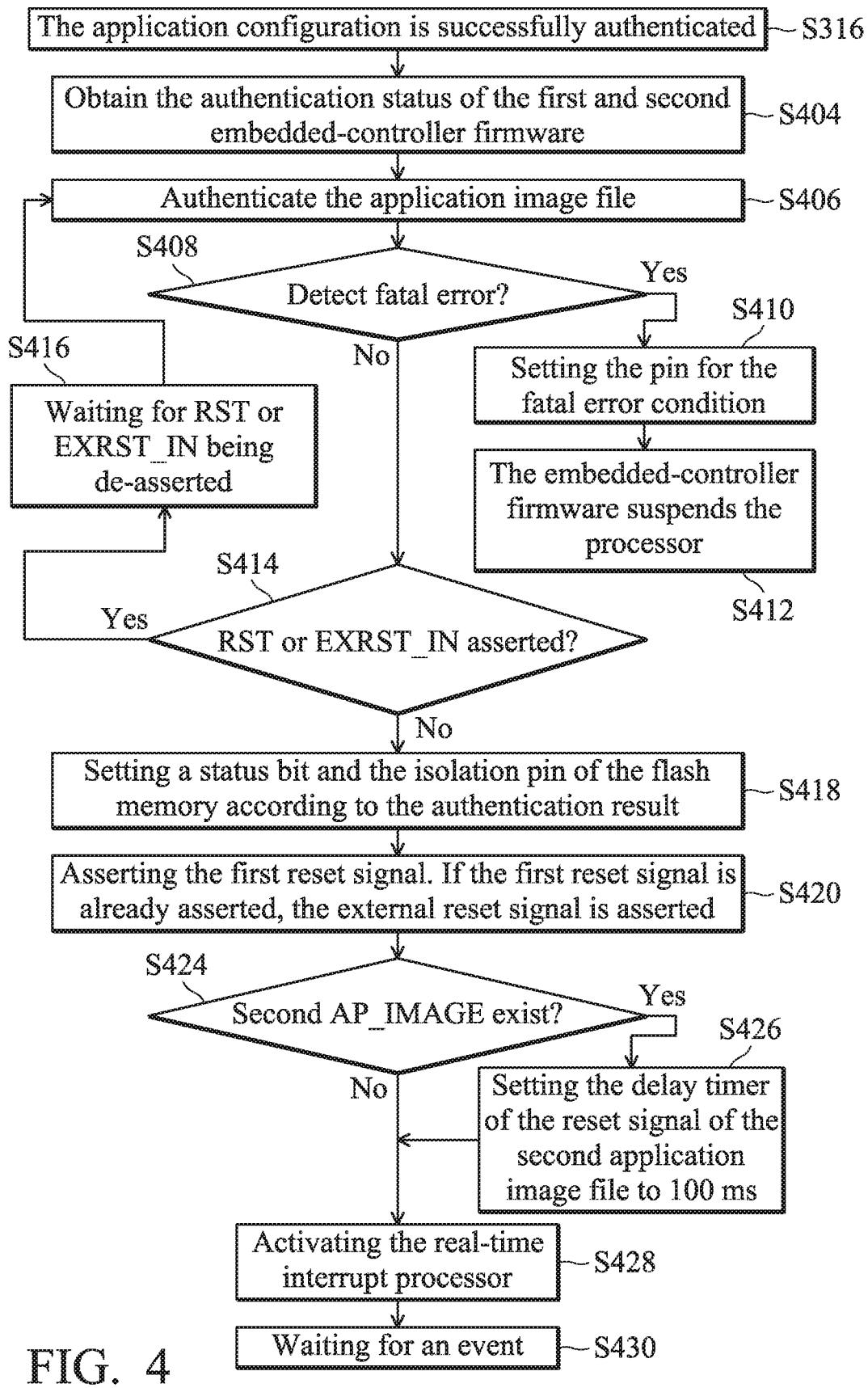
FIG. 4 is a flow chart of authenticating the application image file by the BMC in accordance with an embodiment of the invention.

FIG. 4 is a flow chart of authenticating the application image file by the BMC in accordance with an embodiment of the invention.

The flow of FIG. 4 starts from step S316 in FIG. 3. That is, after the application configuration is successfully authenticated, the microcontroller 210 will de-assert the reset signal 218 to allow the BMC 150 to read the application image file 223 or 233 from the flash memory 120 or 130.

In step S404, an authentication status of the first and second embedded-controller firmware is obtained. For example, according to the flows in FIG. 2 and FIG. 3, one of the first embedded-controller firmware and second embedded-controller firmware is executed by the microcontroller 210, and thus the microcontroller 210 has to obtain the authentication status of the first embedded-controller firmware and the second embedded-controller firmware.

In step S406, the application image file is authenticated. For example, if the microcontroller 210 executes the first embedded-controller firmware (e.g., the embedded-controller firmware 221), the microcontroller 210 will read the application image file 223 from the flash memory 220 and authenticate the application image file 223. If the microcontroller 210 executes the second embedded-controller firmware (e.g., the embedded-controller firmware 231), the microcontroller 210 will read the application image file 233 from the flash memory 230 and authenticate the application image file 233.

In step S408, it is determined whether a fatal error is detected. If a fatal error is detected, step S410 is performed. If no fatal error is detected, step S414 is performed.

In step S410, the pin used for the fatal-error condition is set.

In step S412, the embedded-controller firmware suspends the processor. For example, the fatal-error condition may indicates that the application image file is damaged (e.g., decryption failure) or cannot pass the authentication, and the microcontroller 210 may set the control-signal pin and assert the reset signal 218 to suspend the operations of the BMC 150 and processor 110.

In step S414, it is determined whether the reset signal (ASYNC_RST_DET#) or an external input reset signal (EXRST_IN) is asserted. When it is determined that the reset signal or external input reset signal is asserted, step S416 is performed to wait for the reset signal or the external input reset signal being de-asserted. For example, when the reset signal (ASYNC_RST_DET#) or the external input reset signal (EXRST_IN) is asserted, it indicates that the control mechanism in the autonomous driving system 10 should suspend the operation of the microcontroller 210 or BMC 150.

In step S418, a status bit and an isolation pin of the flash memory are set according to the authentication result. For example, the microcontroller 210 may set the status bit (e.g., 1 indicates authentication success, and 0 indicates authentication failure). If the authentication of the first application image file fails, the microcontroller 210 may set the isolation pin of the flash memory 220 or 230, so that the BMC 150 cannot read the data in the flash memory 220 or 230.

In step S420, a first reset signal (APO_RESET#) is asserted. If the first reset signal is already asserted, the external reset signal is asserted. For example, if the authentication of the application image file 223 fails, the microcontroller 210 may assert the first reset signal (APO_RESET#). If the authentication of the application image file 233 fails, it indicates that the previous authentication of the application image file 223 also fails, and the first reset signal (APO_RESET#) is already asserted. Thus, the microcontroller 210 will assert the external reset signal (EXRST#).

In step S424, it is determined whether the second application image file exists. If it is determined that the second application image file exists, step S426 is performed. If it is determined that the second application image file does not exist, step S428 is performed.

In step S426, a delay timer of a second reset signal (AP1_RESET#) is set to 100 ms.

In step S428, a real-time interrupt processor is activated.

In step S430, an upcoming event is awaited. For example, when the microcontroller 210 or the BMC 150 detects that an event occurs, the real-time interrupt processor will issue an interrupt signal to the processor 110, so that the processor 110 may handle the event.

After the flow in FIG. 4 has been successfully performed, the BMC 150 may read and execute the authenticated application image file 223 or 233 from the flash memory 220 or 230. The BMC 150 may send a notification signal to the PCH 120 through the eSPI bus 122 to notify the processor 110 to start the boot procedure.

Similarly, when the host 100 starts the boot procedure, the processor 110 has to read the BIOS firmware 133 (e.g., the primary boot BIOS firmware) in the flash memory 131. When the processor 110 determines that the BIOS firmware 133 is not damaged and is successfully authenticated, the processor 110 will execute the BIOS firmware 133 to start the boot procedure. When the processor 110 determines that the BIOS firmware 133 is damaged or not successfully authenticated, the processor 110 will read the BIOS firmware 134 (e.g., backup boot BIOS firmware) from the flash memory 132. When the processor 110 determines that the BIOS firmware 134 is not damaged and successfully authenticated, the processor 110 will execute the BIOS firmware 134 to start the boot procedure.

It should be noted that when the autonomous driving system 10 is turned on, the boot sequence of the control system 200 is prior to the BMC 150 and host 100. In addition, the control system 200 includes hardware-based secure boot procedure and root of trust, and also includes dual secure boot firmware. When the control system 200 can successfully execute the embedded-controller firmware and successfully authenticate the application image file, the BMC 150 will execute the authenticated application image file to start operation. Then, the host 100 will start its own boot procedure, for example, the BIOS firmware 133 and 134 can be used for dual boot procedure.

In view of the above, an autonomous driving system with dual secure boot is provided. The autonomous driving system is capable of providing a function of dual secure boot to the control system and the host, and the control system has hardware-based secure boot procedure and root of trust, thereby preventing damage, modification by malicious software, or execution of uncertified firmware and image files, thus ensuring that the autonomous driving system can operate in a stable and safe environment.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An autonomous driving system having dual secure boot, comprising:
a control system; comprising:
a microcontroller;
a first flash memory, configured to store first embedded-controller firmware and a first application image file;
a second flash memory, configured to store second embedded-controller firmware and a second application image file;
a host; and
a baseboard management controller (BMC), coupled between the control system and the host;
wherein when the autonomous driving system is turned on, the microcontroller executes a dual secure boot procedure to execute the first embedded-controller firmware or the second embedded-controller firmware,
wherein in response to the microcontroller successfully executing the first embedded-controller firmware or the second embedded-controller firmware, the microcontroller authenticates the first application image file or the second application image file,
wherein in response to the BMC executing the authenticated first application image file or the authenticated second application image file, the host executes a boot procedure;
wherein during the dual secure boot procedure, the microcontroller decrypts and authenticates the first embedded-controller firmware using a first private key and a first public key, wherein the first private key is an ECDH (Elliptic Curve Diffie-Hellman Key Exchange) private key, and the first public key is a first ECDSA (Elliptic Curve Digital Signature Algorithm) public key, and wherein the microcontroller includes a one-time programmable (OTP) memory, and the OTP memory stores the ECDH private key, the first ECDSA public key, a second ECDSA public key, and an RSA public-key hash value;
wherein when the decryption or authentication of the first embedded-controller firmware fails, the microcontroller decrypts and authenticates the second embedded-controller firmware using the first private key and the first public key.

2. The autonomous driving system as claimed in claim 1, wherein the microcontroller includes a first read-only memory (ROM), and the first ROM stores a bootloader.

3. The autonomous driving system as claimed in claim 2, wherein the first embedded-controller firmware and the second embedded-controller firmware store an ECDH public key and a first ECDSA private key, and the first application image file and the second application image file store an RSA private key.

4. The autonomous driving system as claimed in claim 3, wherein the first flash memory stores a first application configuration and the second flash memory stores a second application configuration, and the first application configuration and the second application configuration store a second ECDSA private key.

5. The autonomous driving system as claimed in claim 4, wherein during the dual secure boot procedure, when the microcontroller successfully executes the first embedded-controller firmware, the microcontroller authenticates the first application configuration using the second ECDSA public key,
wherein when the authentication of the first application configuration fails, the microcontroller authenticates the second application configuration using the second ECDSA public key,
wherein when the microcontroller successfully executes the second embedded-controller firmware, the microcontroller authenticates the second application configuration using the second ECDSA public key.

6. The autonomous driving system as claimed in claim 5, wherein during the dual secure boot procedure, the microcontroller decrypts the first application image file or the second application image file using the RSA public key stored in the first flash memory or the second flash memory and the RSA public-key has value.

7. The autonomous driving system as claimed in claim 1, wherein when the microcontroller is executing the dual secure boot procedure, the microcontroller transmits a reset signal to the BMC and the host to suspend operations of the BMC and the host.

8. The autonomous driving system as claimed in claim 7, wherein after the microcontroller completes the dual secure boot procedure and successfully executes the first embedded-controller firmware or the second embedded-controller firmware, the microcontroller de-asserts the reset signal to start the operation of the BMC.

9. The autonomous driving system as claimed in claim 6, wherein the host comprises a processor, a platform control hub (PCH), a third flash memory, and a fourth flash memory, and the PCH is coupled to the processor, the third flash memory, the fourth flash memory, and the BMC, and the third flash memory and the fourth flash memory respectively store first basic input/output system (BIOS) firmware and second BIOS firmware, wherein during the boot procedure of the host, the processor first reads the first BIOS firmware, and when the processor determines that the first BIOS firmware is not damaged and authentication of the first BIOS firmware is successful, the processor executes the first BIOS firmware to allow the boot procedure to proceed, wherein when the processor determines that the first BIOS firmware is damaged or the authentication of the first BIOS firmware fails, the processor reads the second BIOS firmware, and when the processor determines that the second BIOS firmware is not damaged and authentication of the second BIOS firmware is successful, the processor executes the second BIOS firmware to allow the boot procedure to proceed.

\* \* \* \* \*